United States Patent
Li et al.

(10) Patent No.: US 10,313,099 B1
(45) Date of Patent: Jun. 4, 2019

(54) MULTI-LANE COHERENT TRANSCEIVER WITH SYNCHRONIZED LANE RESET SIGNALS

(71) Applicant: MACOM Technology Solutions Holding, Inc., Lowell, MA (US)

(72) Inventors: Li Li, Santa Clara, CA (US); Hiva Hedayati, Santa Clara, CA (US)

(73) Assignee: MACOM Technology Solutions Holding, Inc., Lowell, MA (US)

( * ) Notice: Subject to any disclaimer, the term of this patent is extended or adjusted under 35 U.S.C. 154(b) by 0 days.

(21) Appl. No.: 15/997,361

(22) Filed: Jun. 4, 2018

(51) Int. Cl.
  *H04L 7/00* (2006.01)
  *H04L 7/033* (2006.01)
  *H04B 1/40* (2015.01)

(52) U.S. Cl.
  CPC .............. *H04L 7/0033* (2013.01); *H04B 1/40* (2013.01); *H04L 7/033* (2013.01)

(58) Field of Classification Search
  CPC .......... H04L 7/0033; H04L 7/033; H04B 1/40
  USPC ......................................................... 375/219
  See application file for complete search history.

(56) References Cited

U.S. PATENT DOCUMENTS

| | | | | |
|---|---|---|---|---|
| 6,333,893 B1* | 12/2001 | Keeth | ................... | G11C 7/1072 365/194 |
| 6,901,526 B1* | 5/2005 | Haycock | .................. | G06F 1/12 713/500 |
| 8,912,829 B1* | 12/2014 | Ogden | ..................... | G06F 1/24 327/142 |
| 2006/0117285 A1* | 6/2006 | Kosugi | .................... | G06F 1/24 713/400 |
| 2010/0090876 A1* | 4/2010 | Taft | ..................... | H03M 1/0624 341/166 |
| 2010/0277158 A1* | 11/2010 | Lee | ........................ | G04F 10/005 324/76.79 |

* cited by examiner

*Primary Examiner* — Michael R Neff

(57) ABSTRACT

The reset signals output to the lanes of a multi-lane coherent transceiver are synchronized by first synchronizing an asynchronous reset signal to a low-speed clock signal to generate and output a plurality of synchronized reset signals to the lanes. Within each lane, a synchronous reset signal is delayed to generate a number of delayed synchronous reset signals, and the logic states of the synchronous reset signal and the delayed synchronous reset signals are captured. Based on the captured logic states in each of the lanes, a lane synchronized reset signal from the delayed synchronous reset signals is selected for use across all of the lanes.

20 Claims, 8 Drawing Sheets

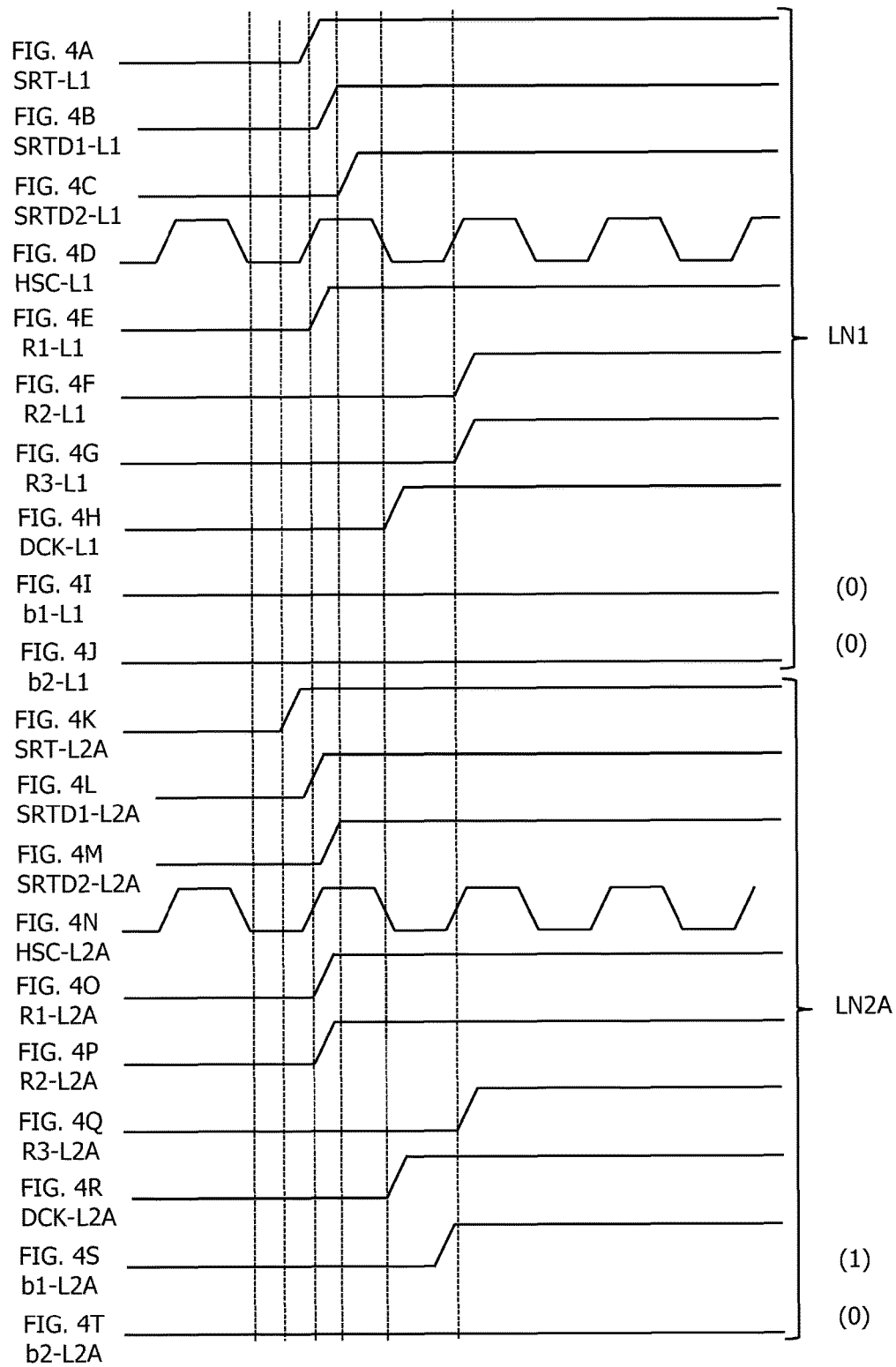

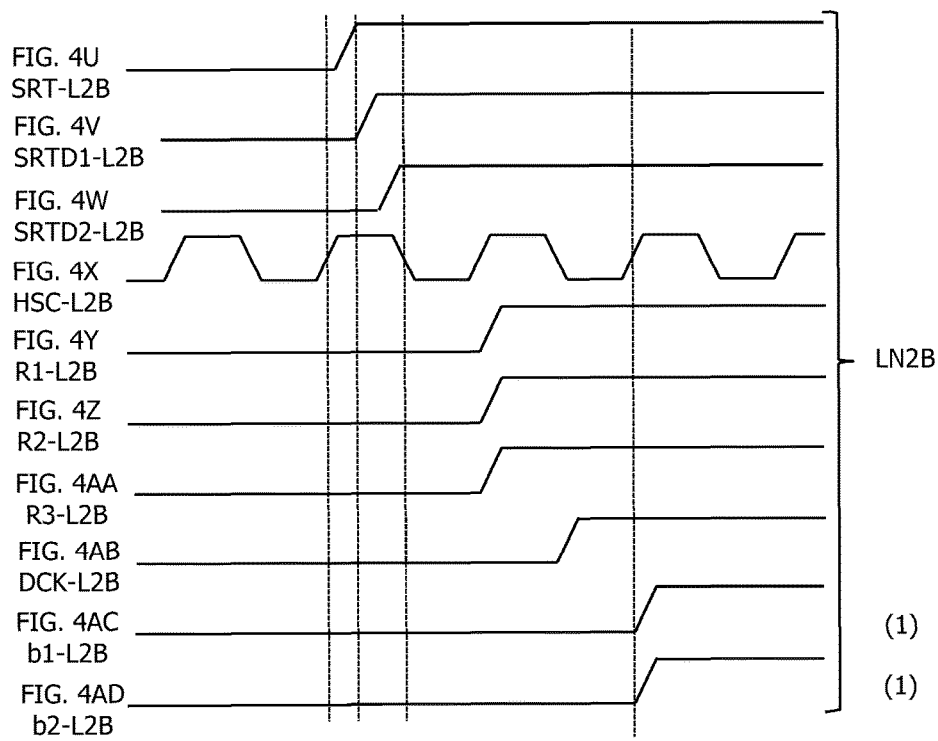

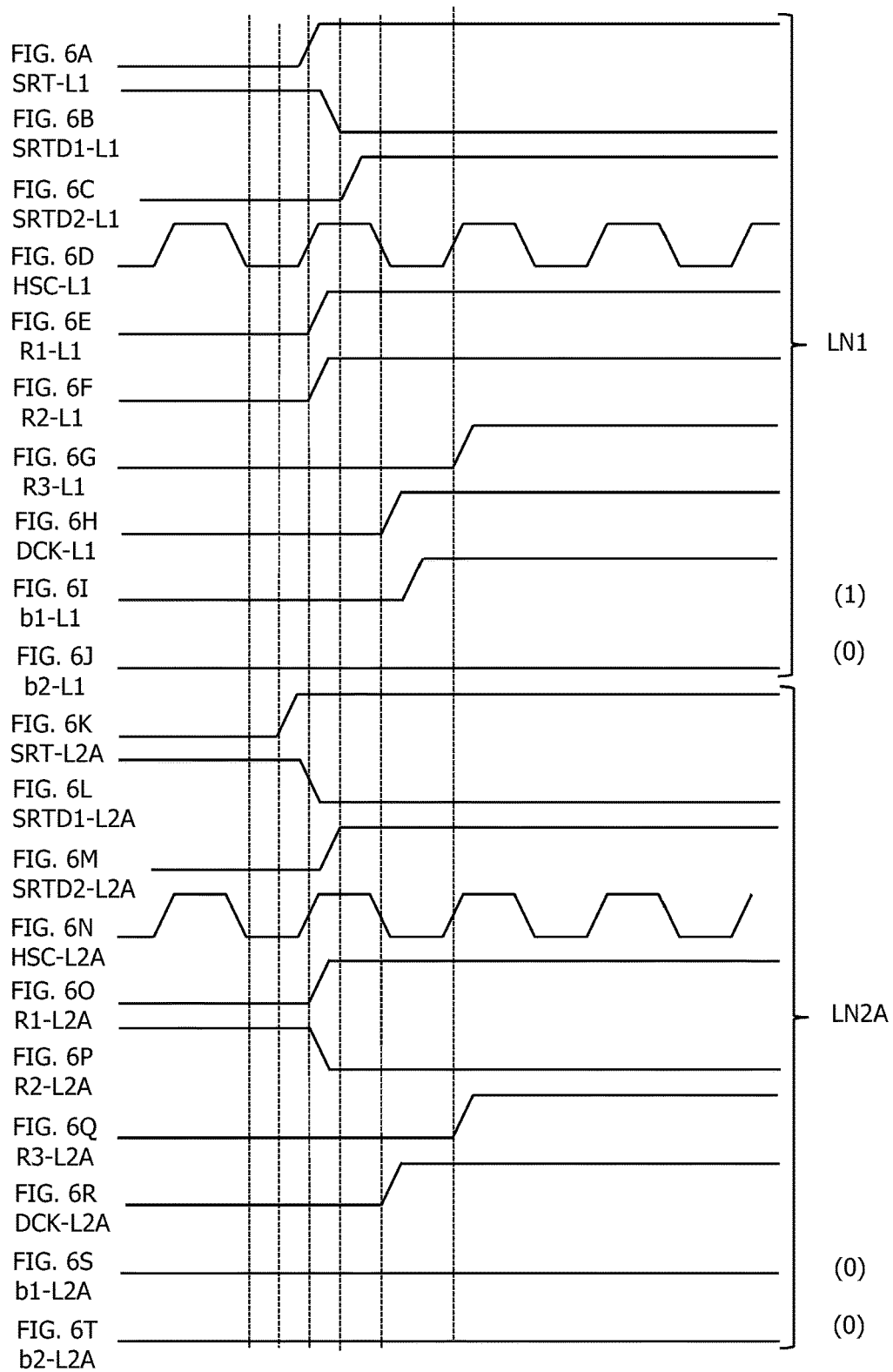

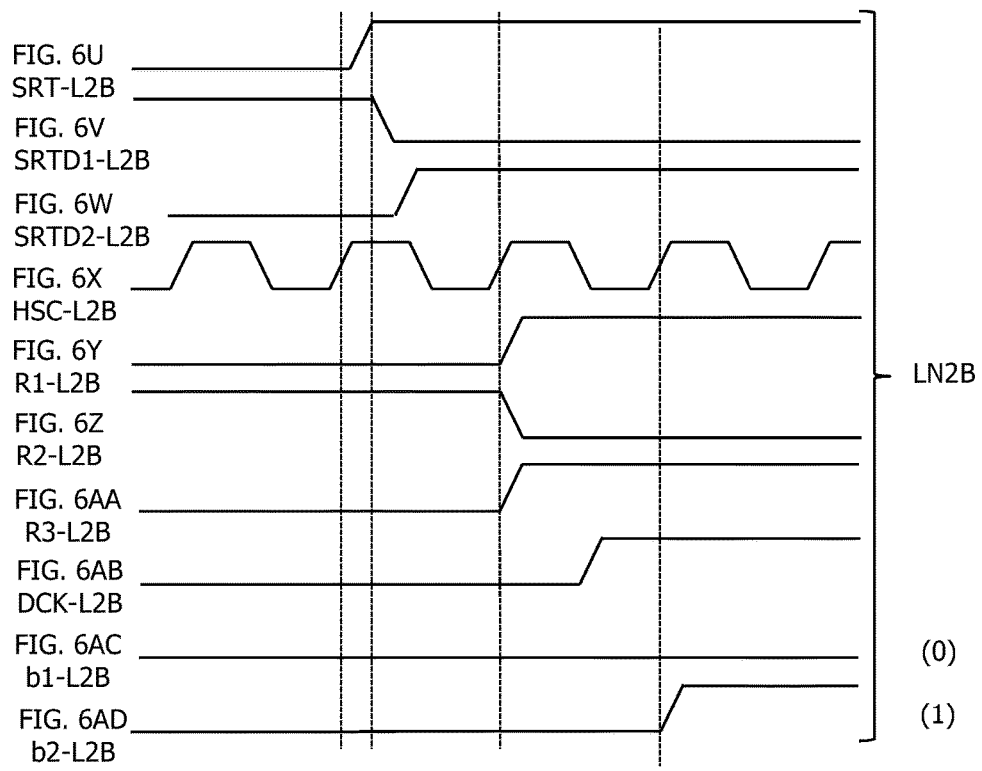

MULTI-LANE COHERENT TRANSCEIVER WITH SYNCHRONIZED LANE RESET SIGNALS

BACKGROUND OF THE INVENTION

1. Field of the Invention.

The present invention relates to multi-lane coherent transceivers and, more particularly, to a multi-lane coherent transceiver with synchronized lane reset signals.

2. Description of the Related Art.

A multi-lane coherent transceiver is a transceiver that has a number of outputs where the data to be transmitted is precisely aligned and synchronized across the different outputs. Multi-lane coherent transceivers are commonly used to increase the amount of data that can be transmitted. For example, a four-lane synchronous transceiver can output four times as much data as a transceiver with only a single output.

In operation, a multi-lane coherent transceiver can receive low-speed digital input signals, such as from a Digital Signal Processing (DSP) unit, and then serialize the input signals using a high-speed clock to form a number of high-speed digital signals. The high-speed digital signals drive analog drivers, which output corresponding analog signals.

Multi-lane coherent transceivers commonly utilize a clock generation circuit that includes a phase-lock-loop (PLL) and a frequency divider. The PLL generates the high-speed clock signal, which is fanned out to each of the lanes, while the frequency divider divides down the high-speed clock signal to form a low-speed clock signal, which is also fanned out to each of the lanes.

The order of the serialized high-speed data is determined by a reset signal that gates or enables the frequency divider. The reset signal is generated by a state machine which is controlled by software or firmware, and therefore the reset signal is not synchronous to the high-speed clock signal in each lane.

One issue with multi-lane coherent transceivers is that the reset signal can potentially be asserted during metastable states of the flip-flops in the clock generation or data register circuits. Jitter and skew in either the clock or reset signal can cause different clock startup timing, which translates into different data orders between different lanes.

FIGS. 1A-1E show timing diagrams that illustrate an example of a potential timing issue with prior-art multi-lane coherent transceivers. FIG. 1A shows a reset signal RST, FIG. 1B shows a lane 0 clock signal CLKL0, FIG. 1C shows a lane 1 clock signal CLKL1, FIG. 1D shows a first sampled signal FSS, and FIG. 1E shows a second sampled signal SSS.

As shown in the FIGS. 1A-1E example, at time t0, the reset signal RST is low when the lane 1 clock signal CLKL1 changes state. At time t1, the reset signal RST is high when the lane 0 clock signal CLKL0 changes state. This slight difference in timing causes the second sampled signal SSS for lane 1 to change state nearly a full clock cycle after the first sampled signal FSS for lane 0 changed state. This delay or skew, in turn, can cause different clock startup timing, which translates into different data orders between different lanes.

Thus, there is a need for a multi-lane coherent transceiver with synchronized lane reset signals that reduces these potential timing issues.

SUMMARY OF THE INVENTION

The present invention provides a transceiver lane and a multi-lane transceiver that synchronizes the lane reset signals to reduce potential timing issues. The transceiver lane of the present invention includes a first time-to-digital converter. The first time-to-digital converter includes a first delay line to delay a synchronized reset signal a first time to output a first delayed synchronized reset signal, and to delay the first delayed synchronized reset signal a second time to output a second delayed synchronized reset signal. The first time-to-digital converter also includes a first signal converter to capture and output a logic state of the synchronized reset signal as a first reset signal, a logic state of the first delayed synchronized reset signal as a second reset signal, and a logic state of the second delayed synchronized reset signal as a third reset signal in response to a transceiver clock signal. The first signal converter to also delay the first reset signal to generate a first clock signal, and capture and output a logic state of the second reset signal as a first bit of a first digital value, and a logic state of the third reset signal as a second bit of the first digital value in response to the first clock signal.

The present invention further provides a method of operating a transceiver lane that includes delaying a synchronized reset signal a first time to output a first delayed synchronized reset signal, and the first delayed synchronized reset signal a second time to output a second delayed synchronized reset signal. The method also includes capturing and outputting a logic state of the synchronized reset signal as a first reset signal, a logic state of the first delayed synchronized reset signal as a second reset signal, and a logic state of the second delayed synchronized reset signal as a third reset signal in response to a transceiver clock signal. In addition, the method includes delaying the first reset signal to generate a first clock signal, and capturing and outputting a logic state of the second reset signal as a first bit of a first digital value, and a logic state of the third reset signal as a second bit of the first digital value in response to the first clock signal.

The present invention also provides a transceiver that includes a reset synchronization circuit to synchronize an asynchronous reset signal to a low-speed clock signal to output a plurality of synchronized reset signals. Further, the transceiver includes a plurality of lanes that are coupled to the reset synchronization circuit. Each lane includes a first time-to-digital converter that includes a first delay line. The first delay line to delay a synchronized reset signal a first time to output a first delayed synchronized reset signal, and to delay the first delayed synchronized reset signal a second time to output a second delayed synchronized reset signal. The first time-to-digital converter to additionally include a first signal converter to capture and output a logic state of the synchronized reset signal as a first reset signal, a logic state of the first delayed synchronized reset signal as a second reset signal, and a logic state of the second delayed synchronized reset signal as a third reset signal in response to a high-speed clock signal. The first signal converter to also delay the first reset signal to generate a first clock signal, and capture and output a logic state of the second reset signal as a first bit of a first digital value, and a logic state of the third reset signal as a second bit of the first digital value in response to the first clock signal.

A better understanding of the features and advantages of the present invention will be obtained by reference to the following detailed description and accompanying drawings which set forth an illustrative embodiment in which the principals of the invention are utilized.

BRIEF DESCRIPTION OF THE DRAWINGS

FIGS. 4A-4AD are a series of timing diagrams illustrating an example of the operation of TDC 300 within different lanes of transceiver 200 in accordance with the present invention. FIGS. 4A-4J are a series of timing diagrams illustrating an example of the operation of TDC 300 in lane LN1 in accordance with the present invention. FIGS. 4K-4T are a series of timing diagrams illustrating an example of the operation of TDC 300 in a first variation of lane-two LN2A in accordance with the present invention. FIGS. 4U-4AD are a series of timing diagrams illustrating an example of the operation of TDC 300 in a second variation of lane-two LN2B in accordance with the present invention.

FIGS. 6A-6AD are a series of timing diagrams illustrating an example of the operation of TDC 500 within different lanes of transceiver 200 in accordance with the present invention. FIGS. 6A-6J are a series of timing diagrams illustrating an example of the operation of TDC 500 in lane LN1 in accordance with the present invention. FIGS. 6K-6T are a series of timing diagrams illustrating an example of the operation of TDC 500 in a first variation of lane-two LN2A in accordance with the present invention. FIGS. 6U-6AD are a series of timing diagrams illustrating an example of the operation of TDC 500 in a second variation of lane-two LN2B in accordance with the present invention.

DETAILED DESCRIPTION OF THE INVENTION

Figure 1:
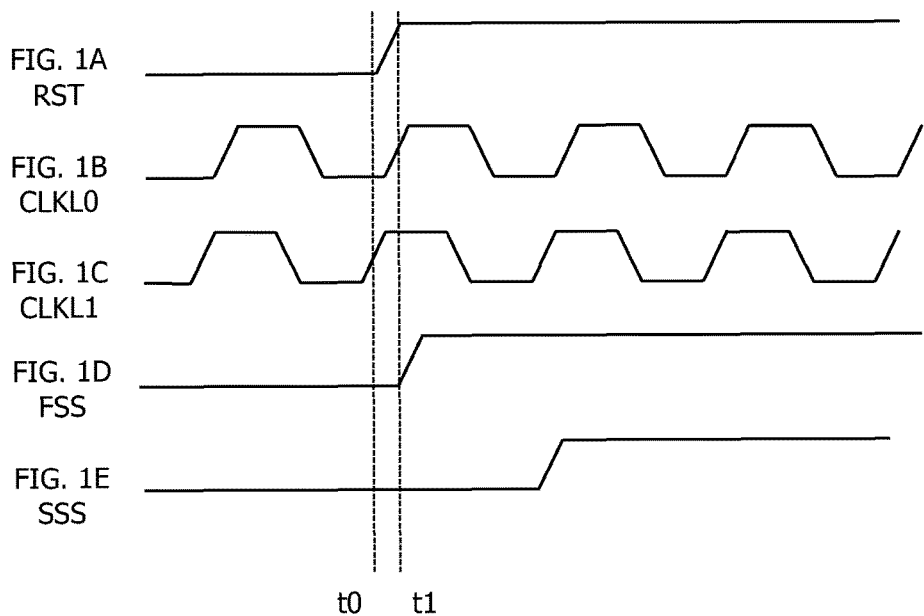
FIGS. 1A-1E are a series of timing diagrams illustrating an example of the potential timing issues with prior-art multi-lane coherent transceivers.
Figure 2:
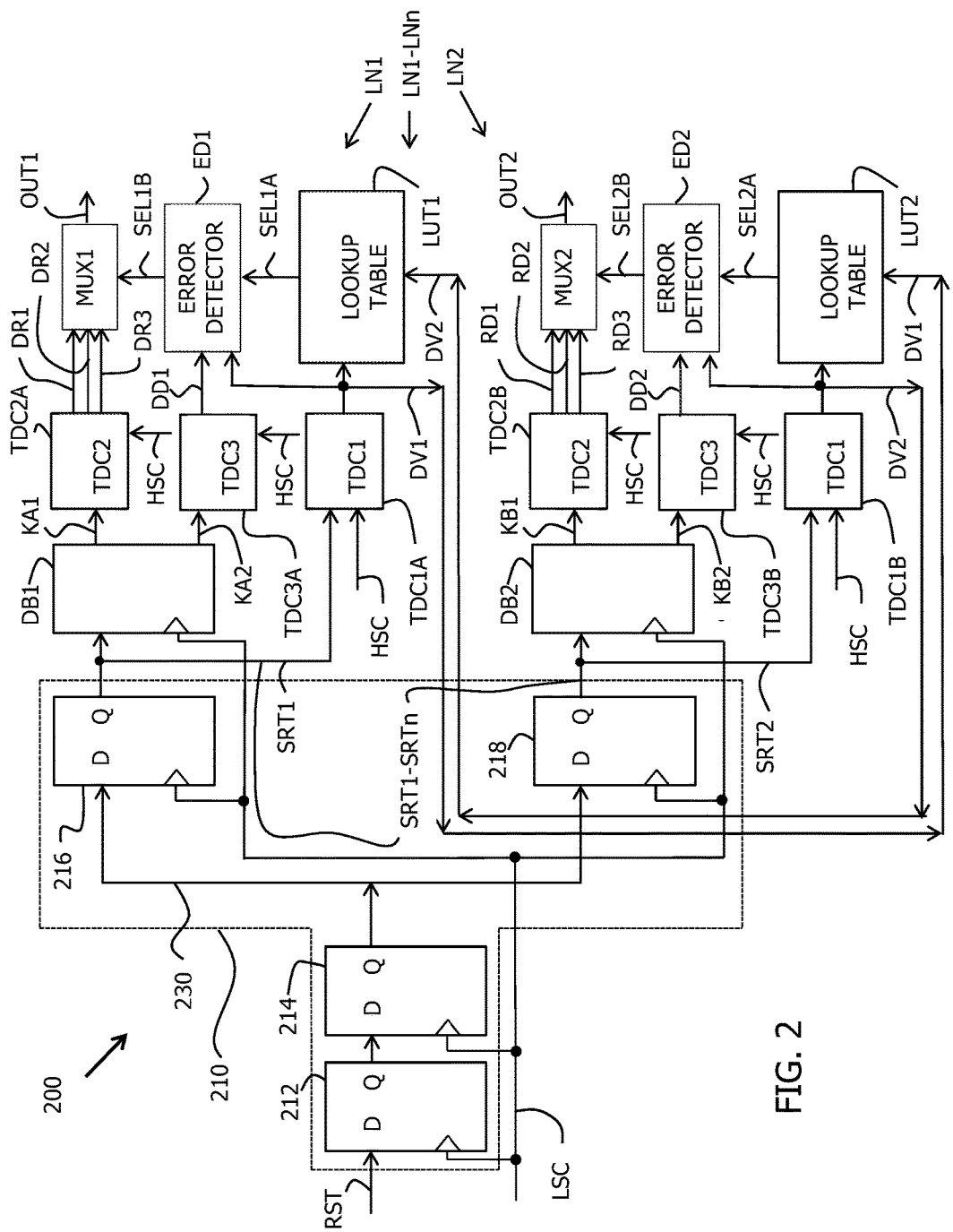
FIG. 2 is a block diagram illustrating an example of a multi-lane coherent transceiver 200 in accordance with the present invention.

FIG. 2 shows a block diagram that illustrates an example of a multi-lane coherent transceiver 200 in accordance with the present invention. As described in greater detail below, multi-lane coherent transceiver 200 synchronizes the lane reset signals that are output to the lanes to reduce potential timing issues.

As shown in FIG. 2, multi-lane coherent transceiver 200 includes a reset synchronization circuit 210 and a number of lanes LN1-LNn that are coupled to reset synchronization circuit 210. Reset synchronization circuit 210 synchronizes an asynchronous reset signal RST to a low-speed clock signal LSC to output a number of synchronized reset signals SRT1-SRTn to the number of lanes LN1-LNn. The low-speed clock signal LSC is an integer fraction of a high-speed clock signal HSC. Other than skew, the synchronized reset signals SRT1-SRTn are substantially-identical. FIG. 2 illustrates multi-lane coherent transceiver 200 with two synchronized reset signals SRT1 and SRT2 that are coupled to two lanes LN1 and LN2.

In the present example, reset synchronization circuit 210 is implemented with a D flip flop 212 that synchronizes the asynchronous reset signal RST to the low-speed clock signal LSC, and a D flip flop 214 that synchronizes the output of flip flop 212 to the low-speed clock signal LSC.

Synchronization circuit 210 also includes a D flip flop for each lane LN which, in the present example, includes a D flip flop 216 that synchronizes the output of flip flop 214 to the low-speed clock signal LSC to output a synchronized reset signal SRT1 to the first lane LN1, and a D flip flop 218 that synchronizes the output of flip flop 214 to the low-speed clock signal LSC to output a synchronized reset signal SRT2 to the second lane LN2.

As further shown in FIG. 2, each of the lanes LN, which are substantially identical, include a first time-to-digital converter TDC1 that delays a synchronized reset signal a first time to form a first delayed synchronized reset signal, and the first delayed synchronized reset signal a second time to form a second delayed synchronized reset signal.

In addition, the first time-to-digital converter TDC1 captures and outputs the logic states of the synchronized reset signal and the first and second delayed synchronized reset signals in response to the high-speed clock signal HSC to output first, second, and third reset signals. The time-to-digital converter TDC1 also delays the first reset signal to form a first clock signal, and captures and outputs a logic state of the second reset signal as a first bit of a first digital value, and a logic state of the third reset signal as a second bit of the first digital value in response to the first clock signal.

In the present example, first lane LN1 includes a time-to-digital converter TDC1A that delays the synchronized reset signal SRT1 to form a first delayed synchronized reset signal, and the first delayed synchronized reset signal to form a second delayed synchronized reset signal. In addition, time-to-digital converter TDC1A captures and outputs the logic states of the synchronized reset signal SRT1 and the first and second delayed synchronized reset signals in response to the high-speed clock signal HSC to output first, second, and third reset signals.

The time-to-digital converter TDC1A also delays the first reset signal to form a first clock signal, and captures and outputs a logic state of the second reset signal as a first bit of a first digital value DV1, and a logic state of the third reset signal as a second bit of the first digital value DV1 in response to the first clock signal.

Similarly, second lane LN2 includes a time-to-digital converter TDC1B that delays synchronized reset signal SRT2 to form a first delayed synchronized reset signal, and the first delayed synchronized reset signal to form a second delayed synchronized reset signal. In addition, time-to-digital converter TDC1B captures and outputs the logic states of the synchronized reset signal SRT2 and the first and second delayed synchronized reset signals in response to the high-speed clock signal HSC to output first, second, and third reset signals.

The time-to-digital converter TDC1B also delays the first reset signal to form a second clock signal, and captures and outputs a logic state of the second reset signal as a first bit of a second digital value DV2, and a logic state of the third reset signal as a second bit of the second digital value DV2 in response to the second clock signal.

Figure 3:
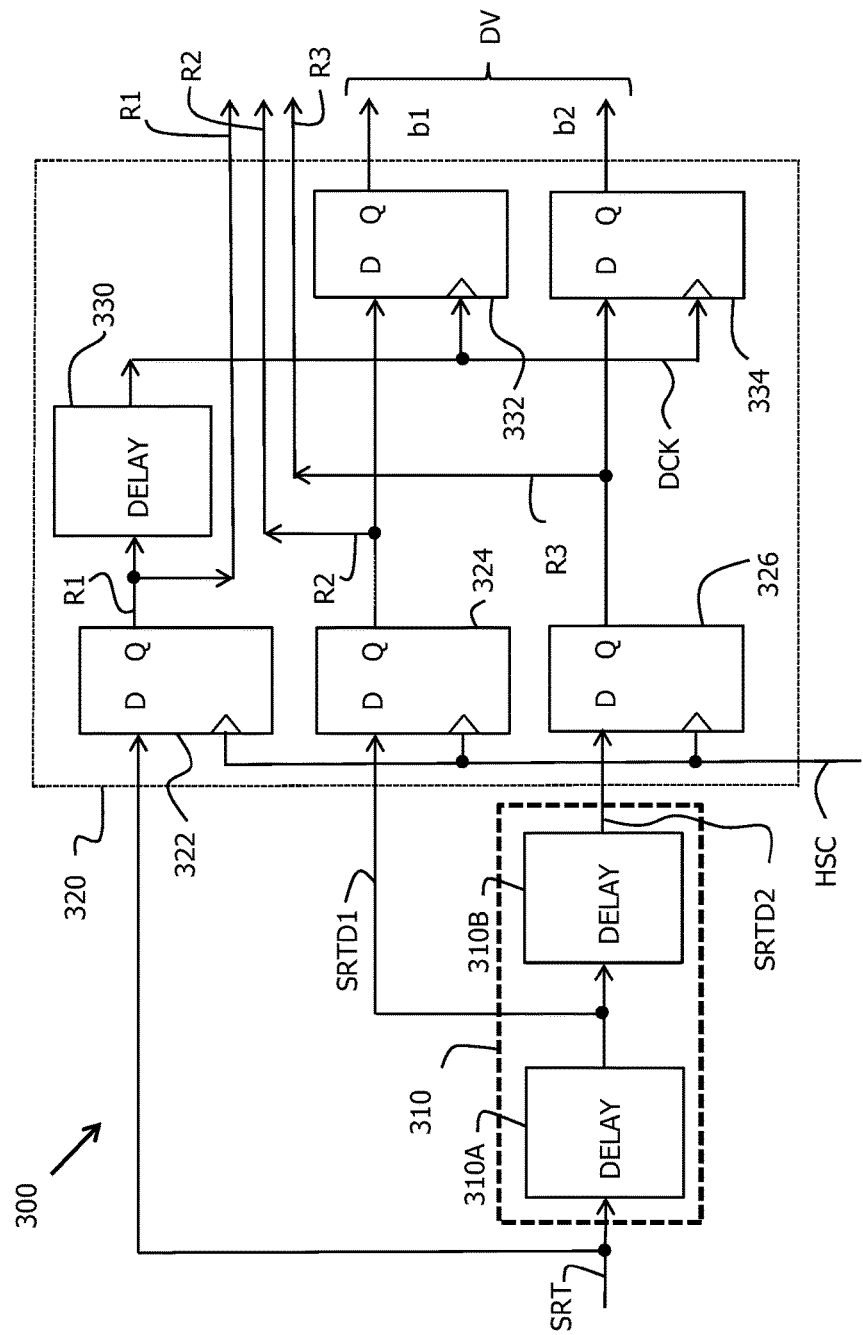
FIG. 3 is a block diagram illustrating an example of a time-to-digital converter (TDC) 300 in accordance with the present invention.

FIG. 3 shows a block diagram that illustrates an example of a time-to-digital converter (TDC) 300 in accordance with the present invention. The time-to-digital converter TDC1 can be implemented with TDC 300. As shown in FIG. 3, TDC 300 includes a delay block 310 that delays a synchronized reset signal SRT to output a first delayed synchronized reset signal SRTD1 a first time after the synchronized reset signal SRT changes state, and a second delayed synchronized reset signal SRTD2 a second time after the first delayed reset signal SRTD1 changes state.

In the present example, delay block 310 is implemented with two delay elements 310A and 310B. Delay element 310A of delay block 310 receives an edge of the synchronized reset signal SRT, and outputs an edge a first delay time later, while delay element 310B outputs an edge a second delay time after the first delay time.

As further shown in FIG. 3, TDC 300 also includes a converter 320 that captures and outputs the logic state of the synchronized reset signal SRT as a first reset signal R1, the logic state of the first delayed synchronized reset signal SRTD1 as a second reset signal R2, and the logic state of the second delayed synchronized reset signal SRTD2 as a third reset signal R3 in response to an edge of the high-speed clock signal HSC.

In addition, converter 320 also delays the first reset signal R1 to form a clock signal DCK, and captures and outputs a logic state of the second reset signal R2 as a first bit b1 of a digital value DV, and a logic state of the third reset signal R3 as a second bit b2 of the digital value DV in response to the clock signal DCK.

In the present example, converter 320 includes a D flip flop 322 that captures the logic state of the synchronized reset signal SRT in response to the high-speed clock signal HSC to output the first reset signal R1, a D flip flop 324 that captures the logic state of the delayed synchronized reset signal SRTD1 in response to the high-speed clock signal HSC to output the second reset signal R2, and a D flip flop 326 that captures the logic state of the delayed synchronized reset signal SRTD2 in response to the high-speed clock signal HSC to output the third reset signal R3.

In addition, converter 320 further includes a delay element 330 that delays the first reset signal R1 to output the clock signal DCK, a D flip flop 332 that captures the state of the second reset signal R2 in response to the clock signal DCK to output the first bit b1 of the digital value DV, and a D flip flop 324 that captures the state of the third reset signal R3 in response to the clock signal DCK to output the second bit b2 of the digital value DV.

FIGS. 4A-4AD show a series of timing diagrams that illustrate an example of the operation of TDC 300 within different lanes of transceiver 200 in accordance with the present invention. FIGS. 4A-4J show a series of timing diagrams that illustrate an example of the operation of TDC 300 in lane LN1 in accordance with the present invention. FIGS. 4K-4T show a series of timing diagrams that illustrate an example of the operation of TDC 300 in a first variation of lane-two LN2A in accordance with the present invention. FIGS. 4U-4AD show a series of timing diagrams that illustrate an example of the operation of TDC 300 in a second variation of lane-two LN2B in accordance with the present invention.

As shown in FIGS. 4A-4C, a lane-one delayed synchronized reset signal SRTD1-L1 changes state a first delay time after a lane-one synchronized reset signal SRT-L1 changes state, and a lane-one delayed synchronized reset signal SRTD2-L1 changes state a second delay time after the lane-one delayed synchronized reset signal SRTD1-L1 changes state.

As shown in FIG. 4D, in this example, the lane-one synchronized reset signal SRT-L1 and a lane-one high-speed clock signal HSC-L1 are synchronized and change state at the same time. In addition, the lane-one high-speed clock signal HSC-L1 changes state before both the lane-one delayed synchronized reset signal SRTD1-L1 and the lane-one delayed synchronized reset signal SRTD2-L1 change states.

As a result, as shown in FIGS. 4E-4G, a lane-one first reset signal R1 output from flip flop 322 changes state immediately after the high-speed clock signal HSC-L1 changes states, while a lane-one second reset signal R2 output from flip flop 324 and a lane-one third reset signal R3 output from flip flop 326 change states nearly a clock cycle later.

As further shown in FIG. 4H, a lane-one first clock signal DCK-L1 changes states a delay time after the first reset signal R1 output from flip flop 322 changes state, which causes flip flops 332 and 334 to capture the states of the second and third reset signals R2 and R3 output from flip flops 324 and 326, respectively, and output the states as a two-bit b1,b2 digital value DV. In the present example, as shown in FIGS. 4I-4J, the digital value DV is 0,0.

With respect to the first variation of lane two, as shown in FIGS. 4K-4N, due to skew, in this example, a lane-two synchronized reset signal SRT-L2A leads the rising edge of a lane-two high-speed clock signal HSC-L2A, a lane-two delayed synchronized reset signal SRTD1-L2A and the lane-two high-speed clock signal HSC-L2A change states together, and a lane-two delayed synchronized reset signal SRTD2-L2A lags the rising edge of the high-speed clock signal HSC-L2A.

As a result, as shown in FIGS. 4O-4Q, a lane-two first reset signal R1-L2A output from flip flop 322 and a lane-two second reset signal R2-L2A output from flip flop 324 change states immediately after the high-speed clock signal HSC-L2A changes state, while a lane-two third reset signal R3-L2A output from flip flop 326 changes state nearly a clock cycle later.

As further shown in FIG. 4R, a lane-two first clock signal DCK-L2A changes state a delay time after the first reset signal R1-L2A output from flip flop 322 changes state, which causes flip flops 332 and 334 to capture the states of the second and third reset signals R2-L2A and R3-L2A output from flip flops 324 and 326, respectively, and output the states as a two-bit b1,b2 digital value DV. In the present example, as shown in FIGS. 4S-4T, the digital value DV is 1,0.

With respect to the second variation of lane two, as shown in FIGS. 4U-4X, due to skew, in this example, a lane-two synchronized reset signal SRT-L2B, a lane-two delayed synchronized reset signal SRTD1-L2B, and a lane-two delayed synchronized reset signal SRTD2-L2B all lag the rising edge of a lane-two high-speed clock signal HSC-L2B.

As a result, as shown in FIGS. 4Y-4AA, a lane-two first reset signal R1-L2B output from flip flop 322, a lane-two second reset signal R2-L2B output from flip flop 324, and a lane-two third reset signal R3-L2B output from flip flop 326 change states nearly a clock cycle later on the next rising edge of the high-speed clock signal HSC-L2B.

As further shown in FIG. 4AB, a lane-two first clock signal DCK-L2B changes state a delay time after the first reset signal R1-L2B output from flip flop 322 changes state, which causes flip flops 332 and 334 to capture the states of the second and third reset signals R2-L2B and R3-L2B output from flip flops 324 and 326, respectively, and output the states as a two-bit b1,b2 digital value DV. In the present example, as shown in FIGS. 4AC-4AD, the digital value DV is 1,1.

Thus, a synchronized reset signal SRT that rises with the rising edge of the high-speed clock signal HSC has a digital value DV of 0,0, while a synchronized reset signal SRT that leads the rising edge of the high-speed clock signal HSC has a digital value DV of 1,0, and a synchronized reset signal SRT that lags the rising edge of the high-speed clock signal HSC has a digital value DV of 1,1.

To synchronize the lane reset signals and the high-speed clock signal HSC across all of the lanes, a handshake scheme between all of the lanes is used. For this scheme to work, there are two requirements. First, the delay of a delay element, such as delay element 310A, must be greater than the maximum skew of the low-speed clock signal LSC between the different lanes. Second, the total delay of delay block 310 must be less than one cycle of the high-speed clock signal HSC.

If these two requirements are met, then only two digital values DV across all of the lanes are possible. For example, in FIGS. 4A-4J, the digital value DV was 0,0. If these two requirements are met, then the digital values DV from all of the other lanes LN will be either 0,0 and 1,0, or 0,0 and 1,1.

The handshake scheme compares the digital values DV from all of the lanes to identify the two digital values that are present from the total possible combinations, which include 00/00, 00/10, 00/11, 10/10, 10/11, and 11/11, and then selects a synchronized reset signal to be output by all of the lanes.

For example, if the two digital values that are present are 00/00, then the rising edge of the synchronized reset signal SRT is used across all of the lanes. This is because, as shown in FIGS. 4A-4C, the synchronized reset signal SRT of the 0,0 digital value is the only signal that does not lag the high-speed clock signal HSC.

If the two digital values that are present are 00/10, then the rising edge of the synchronized reset signal SRT is again used across all of the lanes. This is again because the synchronized reset signal SRT of the 0,0 digital value is the only signal that does not lag the high-speed clock signal HSC. As shown in FIGS. 4A/4E and 4K/4O, the rising edge of the high-speed clock signal HSC will latch a leading 1,0 synchronized reset signal SRT in one lane at the same time that the rising edge of the high-speed clock signal HSC will latch a 0,0 synchronized reset signal SRT that rises with the clock signal in another lane.

On the other hand, if the two digital values that are present are 00/11, then the rising edge of the synchronized reset signal cannot be used. Since the first delayed synchronized reset signal SRTD1 and the second delay synchronized reset signal SRTD2 of the 0,0 digital value both lag the rising edge of the high-speed clock signal HSC, and since all of the synchronized reset signals of the 1,1 digital value lag the rising edge of the high-speed clock signal HSC, either the first delayed synchronized reset signal SRTD1 or the second delay synchronized reset signal SRTD2 can be selected to be used across all of the lanes. Otherwise, if the synchronized reset signal SRT were to be used, as shown in FIGS. 4A/4E and 4U/4Y, then the 0,0 lane would latch during one clock cycle, while the 1,1 lane would latch during the next clock cycle.

A similar evaluation can be made on the remaining digital value combinations, which can then be tabulated and illustrated as shown in TABLE 1 with one of the two possible digital values in a row of digital values and the other one of the two possible digital values in a column of digital values identifying the reset signal to be used.

TABLE 1

|    | 00          | 10         | 11              |
|----|-------------|------------|-----------------|
| 00 | SRT         | SRT        | SRTD1/SRTD2     |
| 10 | SRT         | SRT/SRTD1  | SRTD2           |
| 11 | SRTD1/SRTD2 | SRTD2      | Any one of the 3 |

For example, if the two digital values that are present are 10/11, then the rising edge of the synchronized reset signal cannot be used. This is because the second delayed synchronized reset signal SRTD2 of the 1,0 digital value is the only signal that lags the rising edge of the high-speed clock signal HSC, and since all of the synchronized reset signals of the 1,1 digital value lag the rising edge of the high-speed clock signal HSC, the second delayed synchronized reset signal SRTD2 is selected to be used across all of the lanes. As shown in TABLE 1, intersecting the 1,0 row with the 1,1 column provides the same second delayed synchronized reset signal SRTD2.

Referring again to FIG. 2, in addition to a first time-to-digital converter TDC1, each of the lanes LN also includes a lookup table that implements TABLE 1. The lookup table in a lane receives a digital value from the time-to-digital converter TDC1 in the lane, and a digital value from the time-to-digital converter TDC1 in each other lane, and outputs a select value based on the entries in the lookup table.

In the present example, first lane LN1 includes a lookup table LUT1 that receives a digital value DV1, such as 0,0, from time-to-digital converter TDC1A, and a digital value DV, such as 1,1, from the time-to-digital converters TDC1 from the other lanes which, in the present example, is the digital value DV2 from time-to-digital converter TDC1B. In addition, look up table LUT1 looks up the corresponding value, such as the second delayed synchronized reset signal SRTD2, in the table, and outputs a first select value SEL1A that represents the table value, such as the second delayed synchronized reset signal SRTD2, in response.

Similarly, second lane LN2 includes a lookup table LUT2 that receives the digital value DV2 from time-to-digital converter TDC1B, and the digital values DV of the time-to-digital converters TDC1 from the other lanes which, in the present example, includes the digital value DV1 from time-to-digital converter TDC1A. In addition, look up table LUT2 looks up the corresponding value, and outputs a first select value SEL2A in response.

As shown in FIG. 2, each of the lanes LN also includes a delay block that delays the synchronized reset signal to output a time-offset synchronized reset signal and an offset-lagging synchronized reset signal. The time-offset synchronized reset signal is delayed by an integer number of low-speed clock signals LSC, while the offset-lagging synchronized reset signal is a slightly delayed version of the time-offset synchronized reset signal.

For example, the delay block can be implemented with a first D flip flop that synchronizes the synchronized reset signal SRT to the low-speed clock signal LSC, and a second D flip flop that synchronizes the output of the first flip flop to the low-speed clock signal LSC to output the time-offset synchronized reset signal. In this example, if the D flip flop 216, the first D flip flop, and the second D flip flop have exactly the same propagation delay, then the time-offset synchronized reset signal is in-phase with the synchronized reset signal SRT, but delayed by two low-speed clock periods.

The offset-lagging synchronized reset signal is the same as the time-offset synchronized reset signal except the offset-lagging synchronized reset signal has an additional small delay such that the offset-lagging synchronized reset signal slightly lags the time-offset synchronized reset signal.

The offset-lagging synchronized reset signal can be generated in a number of ways, including using different trace lengths or different propagation delays (e.g., a third D flip flop with a greater propagation delay than the second D flip flop that takes the output of the first flip flop and outputs the offset-lagging synchronized reset signal).

In the present example, the first lane LN1 includes a first delay block DB1 that delays the synchronized reset signal SRT1 to output a time-offset synchronized reset signal KA1 and an offset-lagging synchronized reset signal KA2. Similarly, second lane LN2 includes a second delay block DB2 that delays the synchronized reset signal SRT2 to output a time-offset synchronized reset signal KB1 and an offset-lagging synchronized reset signal KB2.

As further shown in FIG. 2, each of the lanes LN includes a second time-to-digital converter TDC2 that operates the same as the first time-to-digital converter TDC1, except that the second time-to-digital converter TDC2 utilizes a time delayed version of the synchronized reset signal, i.e., the time-offset synchronized reset signal. The time-to-digital converter TDC2 can be implemented with TDC 300.

The time-to-digital converter TDC2 delays the time-offset synchronized reset signal a first time to form a first delayed time-offset synchronized reset signal, and the first delayed time-offset synchronized reset signal a second time to form a second delayed time-offset synchronized reset signal.

The time-to-digital converter TDC2 also captures and outputs a logic state of the time-offset synchronized reset signal as a first delayed reset signal, a logic state of the first delayed time-offset synchronized reset signal as a second delayed reset signal, and a logic state of the second delayed time-offset synchronized reset signal as a third delayed reset signal in response to the high-speed clock signal HSC.

In addition, the time-to-digital converter TDC2 delays the first delayed reset signal to form a second clock signal, and captures and outputs a logic state of the second delayed reset signal as a first bit of a second digital value, and a logic state of the third delayed reset signal as a second bit of the second digital value in response to the second clock signal.

In the present example, first lane LN1 includes a time-to-digital converter TDC2A that delays the time-offset synchronized reset signal KA1 to form a first delayed time-offset synchronized reset signal, and the first delayed time-offset synchronized reset signal a second time to form a second delayed time-offset synchronized reset signal.

The time-to-digital converter TDC2A also captures and outputs a logic state of the time-offset synchronized reset signal KA1 as a first delayed reset signal DR1, a logic state of the first delayed time-offset synchronized reset signal as a second delayed reset signal DR2, and a logic state of the second delayed time-offset synchronized reset signal as a third delayed reset signal DR3 in response to the high-speed clock signal HSC.

The time-to-digital converter TDC2A also delays the first delayed reset signal DR1 to form a second clock signal, and captures and outputs a logic state of the second delayed reset signal as a first bit of a first delayed digital value, and a logic state of the third delayed reset signal as a second bit of the first delayed digital value in response to the high-speed clock signal HSC.

Similarly, second lane LN2 includes a time-to-digital converter TDC2B that delays the time-offset synchronized reset signal KB1 to form a first delayed time-offset synchronized reset signal, and the first delayed time-offset synchronized reset signal a second time to form a second delayed time-offset synchronized reset signal.

The time-to-digital converter TDC2B also captures and outputs a logic state of the time-offset synchronized reset signal KB1 as a first delayed reset signal RD1, a logic state of the first delayed time-offset synchronized reset signal as a second delayed reset signal RD2, and a logic state of the second delayed time-offset synchronized reset signal as a third delayed reset signal RD3 in response to the high-speed clock signal HSC.

The time-to-digital converter TDC2B also delays the first delayed reset signal RD1 to form a second clock signal, and captures and outputs a logic state of the second delayed reset signal as a first bit of a second delayed digital value DD1, and a logic state of the third delayed reset signal as a second bit of the second delayed digital value DD1 in response to the high-speed clock signal HSC.

The second time-to-digital converter TDC2, such as the second time-to-digital converter TDC2A, along with the delay block, such as delay block DB1, provide a save function. The inter-lane handshake scheme takes time, which requires that the first, second, and third reset signals generated by the first time-to-digital converter TDC1, such as the first time-to-digital converter TDC1A, be saved.

In the present example, the first, second, and third reset signals generated by the first time-to-digital converter TDC1 are saved by using the second time-to-digital converter TDC2 to regenerate the first, second, and third reset signals as the first, second, and third delayed reset signals DR1/RD1, DR2/RD2, and DR3/RD3. As noted above, the time-offset synchronized reset signals are in-phase with the synchronized reset signals, but delayed by an integer number of low-speed clock periods. This delay, in turn, provides the time required by the handshake scheme.

As additionally shown in FIG. 2, each of the lanes LN includes a third time-to-digital converter TDC3 that operates the same as the first time-to-digital converter TDC1, except that the time-to-digital converter TDC3 also utilizes a time delayed version of the synchronized reset signal, i.e., the offset-lagging synchronized reset signal. The time-to-digital converter TDC3 can be implemented with TDC 300.

The time-to-digital converter TDC3 delays the offset-lagging synchronized reset signal a first time to form a first delayed offset-lagging synchronized reset signal, and the first delayed offset-lagging synchronized reset signal a second time to form a second delayed offset-lagging synchronized reset signal.

The time-to-digital converter TDC3 also captures and outputs a logic state of the offset-lagging synchronized reset signal as a first lagging reset signal, a logic state of the first delayed offset-lagging synchronized reset signal as a second lagging reset signal, and a logic state of the second delayed offset-lagging synchronized reset signal as a third lagging reset signal in response to the high-speed clock signal HSC.

In addition, the time-to-digital converter TDC3 delays the first lagging reset signal to form a third clock signal, and captures and outputs a logic state of the second lagging reset signal as a first bit of a third digital value, and a logic state of the third lagging reset signal as a second bit of the third digital value in response to the third clock signal.

In the present example, the first lane LN1 includes a time-to-digital converter TDC3A that delays the offset-lagging synchronized reset signal KA2 to form a first delayed offset-lagging synchronized reset signal, and the first delayed offset-lagging synchronized reset signal a second time to form a second delayed offset-lagging synchronized reset signal.

The time-to-digital converter TDC3A also captures and outputs a logic state of the offset-lagging synchronized reset signal as a first lagging reset signal, a logic state of the first delayed offset-lagging synchronized reset signal as a second lagging reset signal, and a logic state of the second delayed offset-lagging synchronized reset signal as a third lagging reset signal in response to the high-speed clock signal HSC.

The time-to-digital converter TDC3A also delays the first lagging reset signal to form a third clock signal, and captures and outputs a logic state of the second lagging reset signal as a first bit of a first delayed digital value DD1, and a logic state of the third lagging reset signal as a second bit of the first delayed digital value DD1 in response to the high-speed clock signal HSC.

Similarly, second lane LN2 includes a time-to-digital converter TDC3B that delays the time-offset synchronized reset signal KB2 to form a first delayed offset-lagging synchronized reset signal, and the first delayed offset-lagging synchronized reset signal a second time to form a second delayed offset-lagging synchronized reset signal.

The time-to-digital converter TDC3B also captures and outputs a logic state of the offset-lagging synchronized reset signal KB2 as a first lagging reset signal, a logic state of the first delayed offset-lagging synchronized reset signal as a second lagging reset signal, and a logic state of the second delayed offset-lagging synchronized reset signal as a third lagging reset signal in response to the high-speed clock signal HSC.

The time-to-digital converter TDC3B also delays the first lagging reset signal to form a third clock signal, and captures and outputs a logic state of the second lagging reset signal as a first bit of a second delayed digital value DD2, and a logic state of the third lagging reset signal as a second bit of the second delayed digital value DD2 in response to the high-speed clock signal HSC.

The third time-to-digital converter TDC3, such as the third time-to-digital converter TDC3A, along with the delay block, such as delay block DB1, provide an checking function. As noted above, a synchronized reset signal SRT that lags the rising edge of the high-speed clock signal HSC has a digital value DV of 1,1. However, a digital value of 1,1 can also be realized when all of the synchronized reset signals (the synchronized reset signal SRT, the first delayed synchronized reset signal SRTD1, and the second delayed synchronized reset signal SRTD2) lead the high-speed clock signal HSC.

If the two TDC1 digital values from all of the lanes are 00/11, and the 1,1 digital value represents the case where all of the synchronized reset signals lead the high-speed clock signal HSC, then the synchronized reset signal SRT is used across all of the lanes. This is a different from TABLE 1, and is because the synchronized reset signal SRT of the 0,0 digital value is the only signal that does not lag the rising edge of the high-speed clock signal HSC. Since all of the synchronized reset signals of the 1,1 digital value lead the rising edge of the high-speed clock signal HSC, the synchronized reset signal SRT is selected to be used across all of the lanes.

If the two TDC1 digital values from all of the lanes are 10/11, and the 1,1 digital value represents the case where all of the synchronized reset signals lead the high-speed clock signal HSC, then the synchronized reset signal SRT or the delayed synchronized reset signal SRTD1 can be used across all of the lanes. This is different from TABLE 1, and is because the synchronized reset signal SRT and the delayed synchronized reset signal SRTD1 of the 1,0 digital value are the only signals that do not lag the rising edge of the high-speed clock signal HSC. Since all of the synchronized reset signals of the 1,1 digital value lead the rising edge of the high-speed clock signal HSC, the synchronized reset signal SRT or the delayed synchronized reset signal SRTD1 can be selected to be used across all of the lanes. Thus, the synchronized reset signal SRT is common to both the 00/11 and 10/11 cases.

However, if the two TDC1 digital values from all of the lanes are 11/11, the first 1,1 digital value represents the case where all of the synchronized reset signals lead the high-speed clock signal HSC, and the second 1,1 digital value represents the case where all of the synchronized reset signals lag the high-speed clock signal HSC, then this is an error condition that cannot be corrected.

The situation where the 1,1 digital value represents the case where all of the synchronized reset signals lead the high-speed clock signal HSC can be detected by comparing the digital value DV generated by the time-to-digital converter TDC1 in a lane with the digital value DV generated by the time-to-digital converter TDC3 in the lane.

As additionally shown in FIG. 2, each of the lanes LN also includes an error detector that receives the digital value output by the first time-to-digital converter TDC1, the digital value output by the third time-to-digital converter TDC3, and the select value that represents the table value from the lookup table.

The error detector first determines whether the digital value of the first time-to-digital converter TDC1 is equal to 1,1. If the digital value of the first time-to-digital converter TDC1 is not equal to 1,1, the error detector passes the select value as a select signal. If the digital value of the first time-to-digital converter TDC1 is equal to 1,1, the error detector next determines whether the digital value of the third time-to-digital converter TDC3 is equal to 1,1. If the digital value of the third time-to-digital converter TDC3 is equal to 1,1, the error detector passes the select value as the select signal. If the digital value of the third time-to-digital converter TDC3 is not equal to 1,1, the error detector instead blocks the select value and forces the select signal to represent select the synchronized reset signal.

As noted above, the time-offset synchronized reset signal is in-phase with the synchronized reset signal, while the offset-lagging synchronized reset signal slightly lags the time-offset synchronized reset signal. The slight delay provided by the offset-lagging synchronized reset signal has the effect of reducing the lead times that the the time-offset synchronized reset signals have over the rising edge of the high-speed clock signal when all of the time-offset synchronized reset signals lead the rising edge of the high-speed clock signal CLK such that one or more of the offset-lagging synchronized reset signals, i.e., the offset-lagging synchronized reset signal, the first delayed offset-lagging synchronized reset signal, and the second delayed offset-lagging synchronized reset signal, no longer leads the rising edge of the high-speed clock signal HSC, but is either coincident with or lagging the rising edge of the high-speed clock signal HSC.

For example, when the second delayed time-offset synchronized reset signal leads the rising edge of the high-speed clock signal HSC, adding in a delay as provided by second delayed offset-lagging synchronized reset signal causes the second delayed offset-lagging signal to no longer lead the rising edge of the high-speed clock signal HSC, but to be either coincident with or lagging the rising edge of the high-speed clock signal HSC. This, in turn, causes the digital value to change.

Thus, when the time-to-digital converter TDC1 has a 1,1 digital value, and the time-to-digital converter TDC3 does not have a 1,1 digital value, the 1,1 digital value from the time-to-digital converter TDC1 represents the case where all of the synchronized reset signals lead the rising edge of the high-speed clock signal HSC.

In this case, the error detector blocks the select value and forces the select signal to represent the first delayed reset signal, which corresponds with the synchronized reset signal, because the synchronized reset signal SRT is common to both the 00/11 and 10/11 cases where the 1,1 digital value represents the case where all of the synchronized reset signals lead the rising edge of the high-speed clock signal HSC.

In the present example, the first lane LN1 includes an error detector ED1 that receives the digital value DV1 output by the first time-to-digital converter TDC1A, the digital value DD1 output by the third time-to-digital converter TDC3A, and the select value SEL1A. The error detector ED1 first determines whether the digital value of the first time-to-digital converter TDC1A is equal to 1,1. If the digital value of the first time-to-digital converter TDC1A is not equal to 1,1, the error detector passes the select value SEL1A as a select signal SEL1B. If the digital value of the first time-to-digital converter TDC1A is equal to 1,1, the error detector ED1 next determines whether the digital value of the third time-to-digital converter TDC3 is equal to 1,1.

If the digital value of the third time-to-digital converter TDC3A is equal to 1,1, the error detector ED1 passes the select value SEL1A as the select signal SEL1B. If the digital value of the third time-to-digital converter TDC3A is not equal to 1,1, the error detector ED1 instead blocks the select value SEL1A and forces the select signal SEL1B to represent the first delayed reset signal DR1, which corresponds with the synchronized reset signal.

Similarly, the second lane LN2 includes an error detector ED2 that receives the digital value DV2 output by the first time-to-digital converter TDC1B, the digital value DD2 output by the third time-to-digital converter TDC3B, and the select value SEL2A. The error detector ED2 first determines whether the digital value of the first time-to-digital converter TDC1B is equal to 1,1. If the digital value of the first time-to-digital converter TDC1B is not equal to 1,1, the error detector ED2 passes the select value SEL1B as a select signal SEL2B.

If the digital value of the first time-to-digital converter TDC1B is equal to 1,1, the error detector ED2 next determines whether the digital value of the third time-to-digital converter TDC3B is equal to 1,1. If the digital value of the third time-to-digital converter TDC3B is equal to 1,1, the error detector ED2 passes the select value SEL2A as the select signal SEL2B. If the digital value of the third time-to-digital converter TDC3B is not equal to 1,1, the error detector ED2 instead blocks the select value SEL2A and forces the select signal SEL2B to represent the first delayed reset signal RD1, which corresponds with the synchronized reset signal.

As further shown in the FIG. 2 example, each of the lanes LN additionally includes a multiplexor that receives the first, second, and third delayed reset signals, and passes one of the first, second, and third delayed reset signals in response to the select signal as an output reset signal.

In the present example, first lane LN1 includes a multiplexor MUX1 that receives the delayed reset signal DR1, the delayed reset signal DR2, and the delayed reset signal DR3 from the time-to-digital converter TDC2A, and passes one of the first, second, and third delayed reset signals DR1, DR2, and DR3 in response to the select signal SEL1B as a synchronized lane-one reset signal OUT1.

Similarly, second lane LN2 includes a multiplexor MUX2 that receives the delayed reset signal RD1, the delayed reset signal RD2, and the delayed reset signal RD3 from time-to-digital converter TDC2B, and passes one of the first, second, and third delayed reset signals RD1, RD2, and RD3 in response to the select signal SEL2B as a synchronized lane-two reset signal OUT2.

In operation, the identity of the synchronized reset signal taken from the lookup table (the synchronized reset signal SRT, the first delayed synchronized reset signal SRTD1, or the second delayed synchronized reset signal SRTD2) is used to determine which of the first, second, and third delayed reset signals DR1, DR2, and DR3 is to be passed, unless altered by the error detector, where the first, second, and third delayed reset signals DR1, DR2, and DR3 correspond with the time-offset synchronized reset signal, the first delayed time-offset synchronized reset signal, and the second delayed time-offset synchronized reset signal, respectively, which, in turn, corresponds with delayed versions of the synchronized reset signal SRT, the first delayed synchronized reset signal SRTD1, and the second delayed synchronized reset signal SRTD2, respectively.

Figure 5:
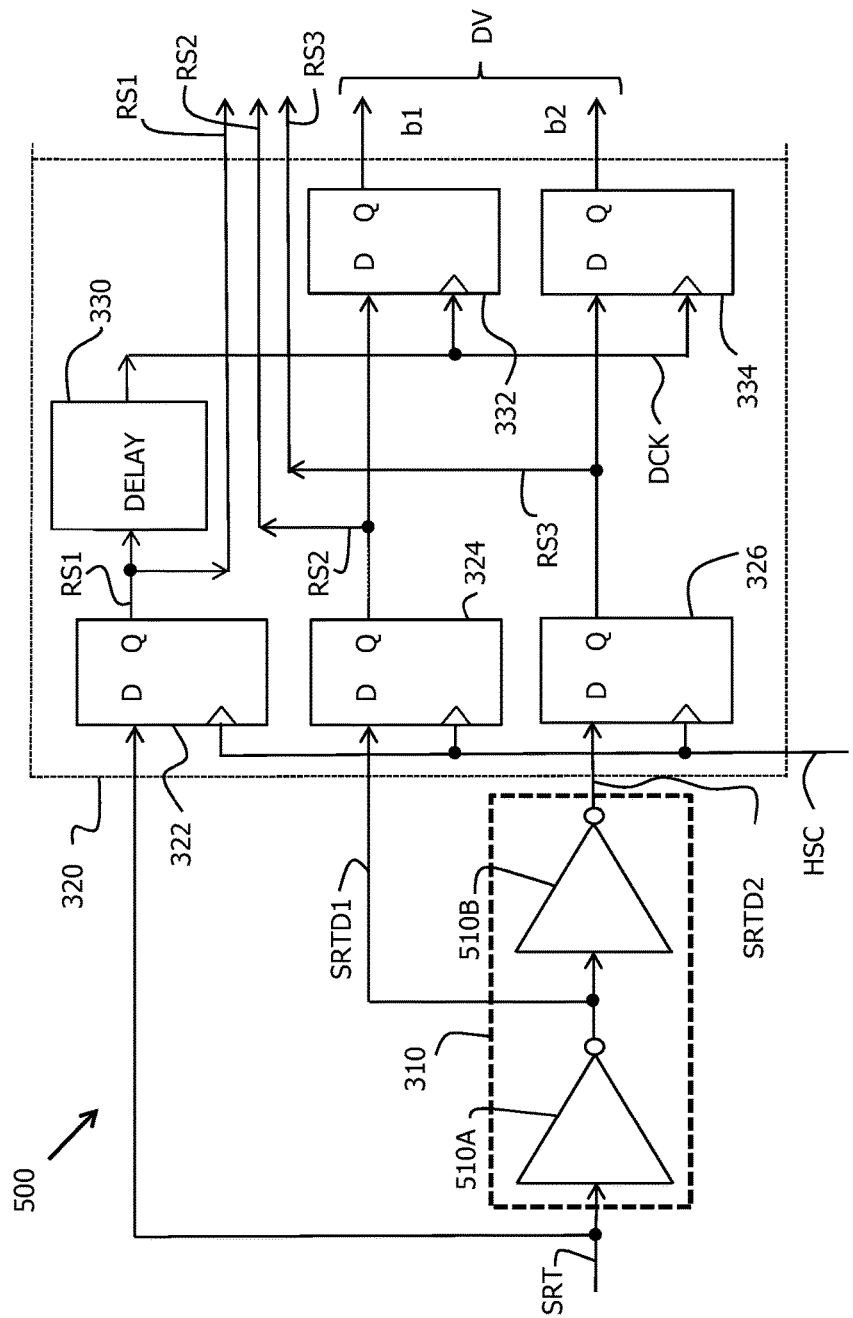
FIG. 5 is a block diagram illustrating an example of a time-to-digital converter (TDC) 500 in accordance with an alternate embodiment of the present invention.

FIG. 5 shows a block diagram that illustrates an example of a time-to-digital converter (TDC) 500 in accordance with an alternate embodiment of the present invention. TDC 500 is similar to TDC 300 and, as a result, utilizes the same reference numerals to designate the structures which are common to both TDCs.

As shown in FIG. 5, TDC 500 differs from TDC 300 in that TDC 500 utilizes an inverter 510A to implement delay element 310A, and an inverter 510B to implement delay element 310B. Inverters 510A and 510B have substantially less delay than other delay elements, such as buffers. In some embodiments, the delay provided by a buffer is too much. TDC 500 operates the same as TDC 300, except that the logic states of the delayed synchronized signal SRTD1, the second reset signal RS2, and the first bit b1 are inverted.

FIGS. 6A-6AD show a series of timing diagrams that illustrate an example of the operation of TDC 500 within different lanes of transceiver 200 in accordance with the present invention. FIGS. 6A-6J show a series of timing diagrams that illustrate an example of the operation of TDC 500 in lane LN1 in accordance with the present invention. FIGS. 6K-6T show a series of timing diagrams that illustrate an example of the operation of TDC 500 in a first variation of lane-two LN2A in accordance with the present invention. FIGS. 6U-6AD show a series of timing diagrams that illustrate an example of the operation of TDC 500 in a second variation of lane-two LN2B in accordance with the present invention.

FIGS. 6A-6AD are similar to FIGS. 4A-4AD, and differ in that the logic states of the delayed synchronized reset signals SRTD1, the second reset signals R2, and the first bits b1 are inverted. TDC 500 also uses TABLE 2 in lieu of TABLE 1, which accounts for the inversion.

TABLE 2

|    | 10          | 00        | 01              |
|----|-------------|-----------|-----------------|
| 10 | SRT         | SRT       | SRTD1/SRTD2     |
| 00 | SRT         | SRT/SRTD1 | SRTD2           |
| 01 | SRTD1/SRTD2 | SRTD2     | Any one of the 3 |

It should be understood that the above descriptions are examples of the present invention, and that various alternatives of the invention described herein may be employed in practicing the invention. Thus, it is intended that the following claims define the scope of the invention and that structures and methods within the scope of these claims and their equivalents be covered thereby.

What is claimed is:

1. A transceiver lane, comprising:
 a first time-to-digital converter, the first time-to-digital converter including:
  a first delay line to delay a synchronized reset signal a first time to output a first delayed synchronized reset signal, and to delay the first delayed synchronized reset signal a second time to output a second delayed synchronized reset signal; and
  a first signal converter to:
   capture and output a logic state of the synchronized reset signal as a first reset signal, a logic state of the first delayed synchronized reset signal as a second reset signal, and a logic state of the second delayed synchronized reset signal as a third reset signal in response to a transceiver clock signal;
   delay the first reset signal to generate a first clock signal; and
   capture and output a logic state of the second reset signal as a first bit of a first digital value, and a logic state of the third reset signal as a second bit of the first digital value in response to the first clock signal.

2. The transceiver lane of claim 1 wherein the first delay line includes:
 a first delay element that delays the synchronized reset signal to generate the first delayed synchronized reset signal; and
 a second delay element that delays the first delayed synchronized reset signal to generate the second delayed synchronized reset signal.

3. The transceiver lane of claim 2 wherein the first delay element is an inverter, and the second delay element is an inverter.

4. The transceiver lane of claim 1 wherein the signal converter includes:
 a first D flip flop that captures and outputs the logic state of the synchronized reset signal as the first reset signal in response to the transceiver clock signal;
 a second D flip flop that captures and outputs the logic state of the first delayed synchronized reset signal as the second reset signal in response to the transceiver clock signal; and
 a third D flip flop that captures and outputs the logic state of the second delayed synchronized reset signal as the third reset signal in response to the transceiver clock signal;
 a delay that delays the first reset signal to generate the first clock signal;
 a fourth D flip flop that captures and outputs a logic state of the second reset signal as a first bit of a digital value in response to the first clock signal; and a fifth D flip flop that captures and outputs a logic state of the third reset signal as a second bit of the digital value in response to the first clock signal.

5. The transceiver lane of claim 1, further comprising a delay block that delays the synchronized reset signal to output a time-offset synchronized reset signal and an offset-lagging synchronized reset signal, the time-offset synchronized reset signal being in-phase with the synchronized reset signal.

6. The transceiver lane of claim 5, further comprising a second time-to-digital converter, the second time-to-digital converter including:
 a second delay line to delay the time-offset synchronized reset signal the first time to output a first delayed time-offset synchronized reset signal, and to delay the first delayed time-offset synchronized reset signal the second time to output a second delayed time-offset synchronized reset signal; and
 a second signal converter to:
  capture and output a logic state of the time-offset synchronized reset signal as a first delayed reset signal, a logic state of the first delayed time-offset synchronized reset signal as a second delayed reset signal, and a logic state of the second delayed time-offset synchronized reset signal as a third delayed reset signal in response to the transceiver clock signal;
  delay the first delayed reset signal to generate a second clock signal; and
  capture and output a logic state of the second delayed reset signal as a first bit of a second digital value, and a logic state of the third delayed reset signal as a second bit of the second digital value in response to the second clock signal.

7. The transceiver lane of claim 6, further comprising a third time-to-digital converter, the third time-to-digital converter including:
 a third delay line to delay the offset-lagging synchronized reset signal the first time to output a first delayed offset-lagging synchronized reset signal, and to delay the first delayed offset-lagging synchronized reset signal the second time to output a second delayed offset-lagging synchronized reset signal; and
 a third signal converter to:
  capture and output a logic state of the offset-lagging synchronized reset signal as a first lagging reset signal, a logic state of the first delayed offset-lagging synchronized reset signal as a second lagging reset signal, and a logic state of the second delayed offset-lagging synchronized reset signal as a third lagging reset signal in response to the transceiver clock signal;
  delay the first lagging reset signal to generate a third clock signal; and
  capture and output a logic state of the second lagging reset signal as a first bit of a third digital value, and a logic state of the third lagging reset signal as a second bit of the third digital value in response to the third clock signal.

8. The transceiver lane of claim 7, further comprising a lookup table, the lookup table to receive the first digital value from the first time-to-digital converter, look up a table value based on information that includes the first digital value, and output a select value that represents the table value.

9. The transceiver lane of claim 8, further comprising:
 an error detector to:
  receive the first digital value output by the first time-to-digital converter, the third digital value output by the third time-to-digital converter, and the select value that represents the table value from the lookup table;
  block the select value and output a select signal that represents the first delayed reset signal when the first digital value represents a first condition, and the third digital value represents a different condition;
  pass the select value as the select signal when the first and third digital values both represent the first condition; and pass the select value as the select signal when the first digital value represents the different condition; and
a multiplexor that receives the first delayed reset signal, the second delayed reset signal, and the third delayed reset signal, and passes one of first delayed reset signal, the second delayed reset signal, and the third delayed reset signal in response to the select signal.

10. A method of operating a transceiver lane, the method comprising:
delaying a synchronized reset signal a first time to output a first delayed synchronized reset signal, and the first delayed synchronized reset signal a second time to output a second delayed synchronized reset signal;
capturing and outputting a logic state of the synchronized reset signal as a first reset signal, a logic state of the first delayed synchronized reset signal as a second reset signal, and a logic state of the second delayed synchronized reset signal as a third reset signal in response to a transceiver clock signal;
delaying the first reset signal to generate a first clock signal; and
capturing and outputting a logic state of the second reset signal as a first bit of a first digital value, and a logic state of the third reset signal as a second bit of the first digital value in response to the first clock signal.

11. The method of claim 10, further comprising delaying the synchronized reset signal to output a time-offset synchronized reset signal and an offset-lagging synchronized reset signal, the time-offset synchronized reset signal being in-phase with the synchronized reset signal.

12. The method of claim 11, further comprising:
delaying the time-offset synchronized reset signal the first time to output a first delayed time-offset synchronized reset signal, and the first delayed time-offset synchronized reset signal the second time to output a second delayed time-offset synchronized reset signal;
capturing and outputting a logic state of the time-offset synchronized reset signal as a first delayed reset signal, a logic state of the first delayed time-offset synchronized reset signal as a second delayed reset signal, and a logic state of the second delayed time-offset synchronized reset signal as a third delayed reset signal in response to the transceiver clock signal;
delaying the first delayed reset signal to generate a second clock signal; and
capturing and outputting a logic state of the second delayed reset signal as a first bit of a second digital value, and a logic state of the third delayed reset signal as a second bit of the second digital value in response to the second clock signal.

13. The method of claim 12, further comprising:
delaying the offset-lagging synchronized reset signal the first time to output a first delayed offset-lagging synchronized reset signal, and the first delayed offset-lagging synchronized reset signal the second time to output a second delayed offset-lagging synchronized reset signal;
capturing and outputting a logic state of the offset-lagging synchronized reset signal as a first lagging reset signal, a logic state of the first delayed offset-lagging synchronized reset signal as a second lagging reset signal, and a logic state of the second delayed offset-lagging synchronized reset signal as a third lagging reset signal in response to the transceiver clock signal;
delaying the first lagging reset signal to generate a third clock signal; and capturing and outputting a logic state of the second lagging reset signal as a first bit of a third digital value, and a logic state of the third lagging reset signal as a second bit of the third digital value in response to the third clock signal.

14. The method of claim 13, further comprising receiving the first digital value from the first time-to-digital converter;
looking up a table value based on information that includes the first digital value;
outputting a select value that represents the table value;
receiving the first digital value output by the first time-to-digital converter, the third digital value output by the third time-to-digital converter, and the select value that represents the table value from the lookup table;
blocking the select value and outputting a select signal that represents the first delayed reset signal when the first digital value represents a first condition, and the third digital value represents a different condition;
passing the select value as the select signal when the first and third digital values both represent the first condition;
passing the select value as the select signal when the first digital value represents the different condition;
receiving the first delayed reset signal, the second delayed reset signal, and the third delayed reset signal; and
passing one of first delayed reset signal, the second delayed reset signal, and the third delayed reset signal in response to the select signal.

15. A transceiver comprising:
a reset synchronization circuit to synchronize an asynchronous reset signal to a low-speed clock signal to output a plurality of synchronized reset signals;
a plurality of lanes coupled to the reset synchronization circuit, each lane to include:
a first time-to-digital converter having:
a first delay line to delay a synchronized reset signal a first time to output a first delayed synchronized reset signal, and to delay the first delayed synchronized reset signal a second time to output a second delayed synchronized reset signal; and
a first signal converter to:
capture and output a logic state of the synchronized reset signal as a first reset signal, a logic state of the first delayed synchronized reset signal as a second reset signal, and a logic state of the second delayed synchronized reset signal as a third reset signal in response to a high-speed clock signal;
delay the first reset signal to generate a first clock signal; and
capture and output a logic state of the second reset signal as a first bit of a first digital value, and a logic state of the third reset signal as a second bit of the first digital value in response to the first clock signal.

16. The transceiver of claim 15, wherein each lane further includes a second time-to-digital converter, the second time-to-digital converter to include:
a second delay line to delay the time-offset synchronized reset signal the first time to output a first delayed time-offset synchronized reset signal, and to delay the first delayed time-offset synchronized reset signal the second time to output a second delayed time-offset synchronized reset signal; and
a second signal converter to:
capture and output a logic state of the time-offset synchronized reset signal as a first delayed reset signal, a logic state of the first delayed time-offset synchronized reset signal as a second delayed reset signal, and a logic state of the second delayed time-offset synchronized reset signal as a third delayed reset signal in response to the high-speed clock signal;

delay the first delayed reset signal to generate a second clock signal; and capture and output a logic state of the second delayed reset signal as a first bit of a second digital value, and a logic state of the third delayed reset signal as a second bit of the second digital value in response to the second clock signal.

17. The transceiver of claim 16, wherein each lane further includes a third time-to-digital converter, the third time-to-digital converter to include:

a third delay line to delay the offset-lagging synchronized reset signal the first time to output a first delayed offset-lagging synchronized reset signal, and to delay the first delayed offset-lagging synchronized reset signal the second time to output a second delayed offset-lagging synchronized reset signal; and a third signal converter to:

capture and output a logic state of the offset-lagging synchronized reset signal as a first lagging reset signal, a logic state of the first delayed offset-lagging synchronized reset signal as a second lagging reset signal, and a logic state of the second delayed offset-lagging synchronized reset signal as a third lagging reset signal in response to the transceiver clock signal;

delay the first lagging reset signal to generate a third clock signal; and capture and output a logic state of the second lagging reset signal as a first bit of a third digital value, and a logic state of the third lagging reset signal as a second bit of the third digital value in response to the third clock signal.

18. The transceiver of claim 17, wherein each lane further includes a lookup table, the lookup table in a lane to:

receive the first digital value from the first time-to-digital converter in the lane, and the first digital value from the first time-to-digital converter in each other lane;

look up a table value based on the first digital value from the first time-to-digital converter in the lane and the first digital value from the first time-to-digital converter in each other lane; and output a select signal that represents the table value.

19. The transceiver of claim 18, wherein each lane further includes an error detector to:

receive the first digital value output by the first time-to-digital converter, the third digital value output by the third time-to-digital converter, and the select value that represents the table value from the lookup table;

block the select value and output a select signal that represents the first delayed reset signal when the first digital value represents a first condition, and the third digital value represents a different condition;

pass the select value as the select signal when the first and third digital values both represent the first condition; and pass the select value as the select signal when the first digital value represents the different condition; and a multiplexor that receives the first delayed reset signal, the second delayed reset signal, and the third delayed reset signal, and passes one of first delayed reset signal, the second delayed reset signal, and the third delayed reset signal in response to the select signal.

20. The transceiver of claim 18 wherein the low-speed clock signal is an integer fraction of the high-speed clock signal.

* * * * *